US007558561B1

(12) United States Patent  
Debaty et al.

(10) Patent No.: US 7,558,561 B1  
(45) Date of Patent: Jul. 7, 2009

(54) SYSTEM FOR COMMUNICATING A STORY MAIL BETWEEN COMMUNICATIONS DEVICES THAT EXTENDS VOICE MAIL

(75) Inventors: Philippe Debaty, Mountain View, CA (US); Margaret Fleck, Fremont, CA (US); Patrick Goddi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 933 days.

(21) Appl. No.: 10/861,815

(22) Filed: Jun. 4, 2004

(51) Int. Cl.  
*H04M 11/10* (2006.01)
(52) U.S. Cl. .................................. 455/413; 455/208
(58) Field of Classification Search ................ 455/566, 455/41.3, 3.06, 412.1, 412.2, 413, 414.1, 455/502, 208, 265; 709/203  
See application file for complete search history.

(56) References Cited

U.S. PATENT DOCUMENTS

2003/0014755 A1* 1/2003 Williams ..................... 725/62  
2005/0049005 A1* 3/2005 Young et al. ................ 455/566

OTHER PUBLICATIONS

Amanda Stent and Alexander Loui (2001) "Using Event Segmentation to Improve Indexing of Consumer Photographs", Proc Sigir 01, pp. 59-65.

Marko Balabanovic, Lonny L. Chu, and Gregory J. Wolff (2000) "Storytelling with Digital Photographs", CHI 2000, pp. 564-571.  
David Frohlich, Guy Adams, Ella Tallyn (2000) "Augmenting Photographs with Audio", Personal Technologies pp. 205-208.  
David Frohlich (2001) "Photoware: Past, Present and Future", HPL TR HPL-2001-86.  
Maurizio Pilu (2000) "PicShare: ACapture-centric remote collaboration tool", HPL Technical Report HPL 2004-14 (HP Internal).  
Katerina Pastra, Horacio Saggion, Yorick Wilks (2003) "Extracting relational facts for indexing and retrieval of crime scene photographs", Department of Computer Science, University of Sheffield, Oct. 21, 2002.  
Timothy J. Mills, David Pye, David Sinclair, and Kenneth R. Wood (2000) "Shoebox: A Digital Photo Management System", AT &T Laboratories, Cambridge, TR Oct. 2000.

* cited by examiner

*Primary Examiner*—Tu X Nguyen

(57) ABSTRACT

Methods and systems for communicating a story mail between communications devices extends voice mail are provided. In one embodiment, user specified correlation information that describes a correlation for presenting visual media with continuous audio data is used to generate synchronization information. A story mail transmitting device transmits a story mail that is associated with synchronization information. A story mail receiving device uses the synchronization information to present the continuous audio data and the visual media associated with the story mail. Either the story mail transmitting device or the story mail receiving device is a handheld communications device.

19 Claims, 7 Drawing Sheets

SYSTEM FOR COMMUNICATING A STORY MAIL BETWEEN COMMUNICATIONS DEVICES THAT EXTENDS VOICE MAIL

RELATED APPLICATIONS

This application is related to U.S. patent application Ser. No. 10/861,046 by Margaret M. Fleck and Philip Burkam, filed on the same date as the present application and entitled "A System and Method for Capturing Multimedia", assigned to the assignee of the present invention and incorporated herein by reference.

This application is related to U.S. patent application Ser. No. 10/861,814 by Margaret M. Fleck, filed on the same date as the present application and entitled "Providing Vocabulary to an Electronic Photo Displayer", assigned to the assignee of the present invention and incorporated herein by reference.

This application is related to U.S. patent application Ser. No. 10/861,048 by Margaret M. Fleck, filed on the same date as the present application and entitled "Modifying the Display of Electronic Photos Based on a User's Viewing Patterns", assigned to the assignee of the present invention and incorporated herein by reference.

TECHNICAL FIELD

Embodiments of the present invention relate to communicating audio data and visual media between users. More specifically, embodiments of the present invention relate to communicating a story mail between communications devices where at least one of the communications devices is a handheld device.

BACKGROUND ART

Many people desire to share photos of their friends, family, interests, and experiences, for example, along with descriptions of the photos with other people. With the advent of computers, which include handheld communications devices, such as, cell phones, camera phones etc., and the Internet, the possible ways for people to share their photos and descriptions of the photos has broadened. For example, a person may be on a trip to Yosemite and they may want to share the experience of their trip with a friend. Therefore, there is a need for methods and systems that allow people to share photos and a description of the photos with other people using computers.

DISCLOSURE OF THE INVENTION

Embodiments of the present invention pertain to methods and systems for communicating a story mail between communications devices that extends voice mail is described. In one embodiment, user specified correlation information that describes a correlation for presenting visual media with continuous audio data is used to generate synchronization information. A story mail transmitting device transmits a story mail that is associated with synchronization information. A story mail receiving device uses the synchronization information to present the continuous audio data and the visual media associated with the story mail. Either the story mail transmitting device or the story mail receiving device is a handheld communications device.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

In this case, they associate audio data that describes a single photo in one audio clip. There is a separate audio clip for each photo with audio data that describes that photo.

Functional and System Overview

Figure 1:
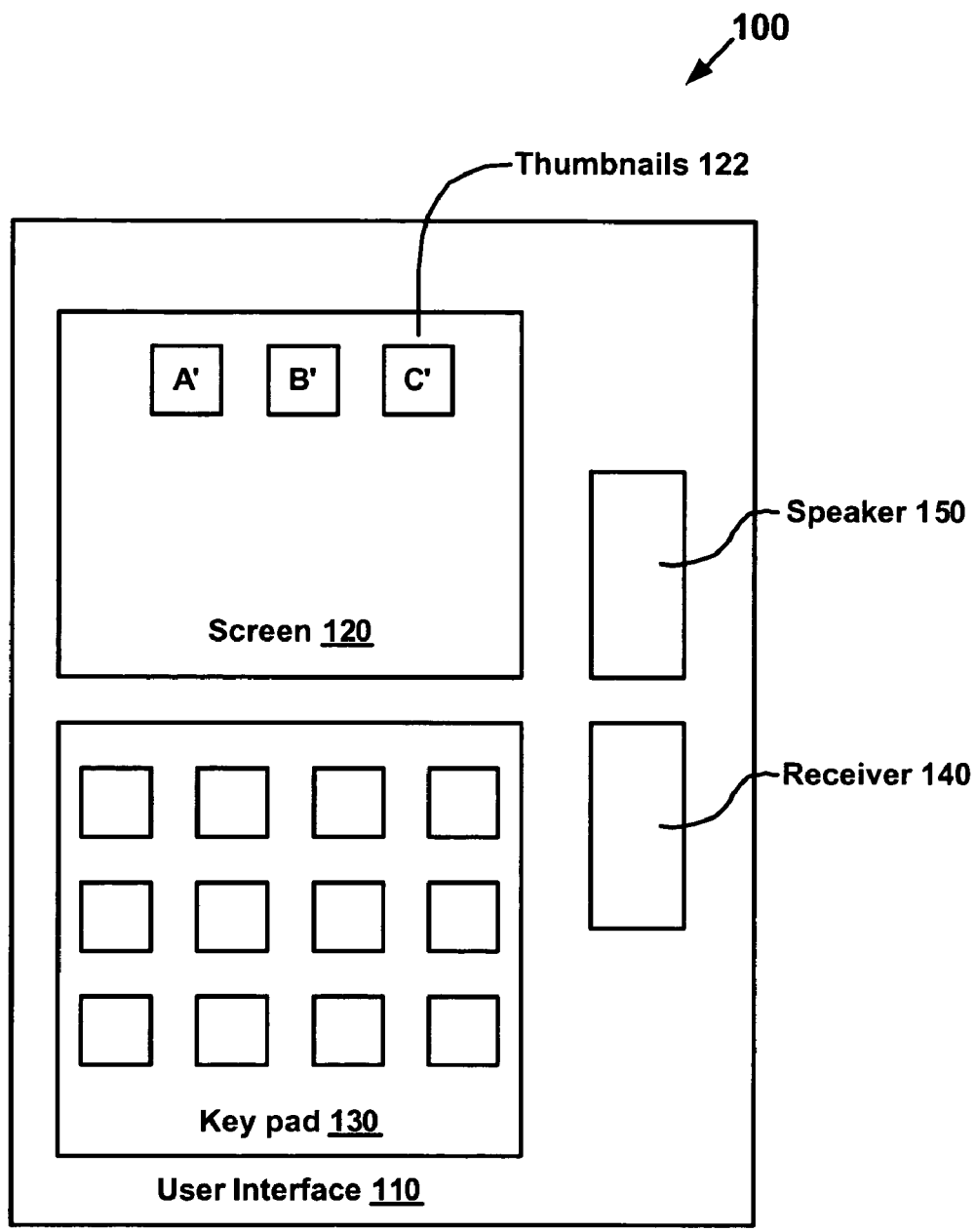
FIG. 1 depicts a block diagram of an exemplary handheld communications device for associating audio data with visual media, according to one embodiment.

FIG. 1 depicts a block diagram of an exemplary communications device for creating and/or presenting a story mail, according to one embodiment. According to one embodiment, a story mail may be used for presenting visual media with a verbal description of the visual media in the form of continuous audio data, as will b described in more detail. According to one embodiment, visual media comprises more than one visual representation derived from, for example, electronic photos, video clips, Uniform Resource Locator (URLs), HyperText Markup Language (HTML), etc. For example, continuous audio data may be associated with an audio clip that describes more than one visual representation, such as several photos, to create a story mail for presentation to a user, as will be described in more detail. In a second example, the continuous audio data that describes several photos and several video clips may be associated with an audio clip to create a story mail.

The communications device 100, depicted in FIG. 1, may include a user interface 110, a receiver 140, such as a microphone, and a speaker 150. The user interface 110 includes a keypad 130 for entering data and a screen 120 for displaying thumbnails 122 (e.g., A', B', C') of visual media.

Communications device 100 may be any device that can be used for creating, transmitting, and/or presenting a story mail, such as a cell phone, a camera phone, a Personal Digital Assistant (PDA), Personal Computer (PC), or a television, according to one embodiment. A device 100 may be a handheld communications device, such as a cell phone, a camera phone, or a PDA.

Figure 2:
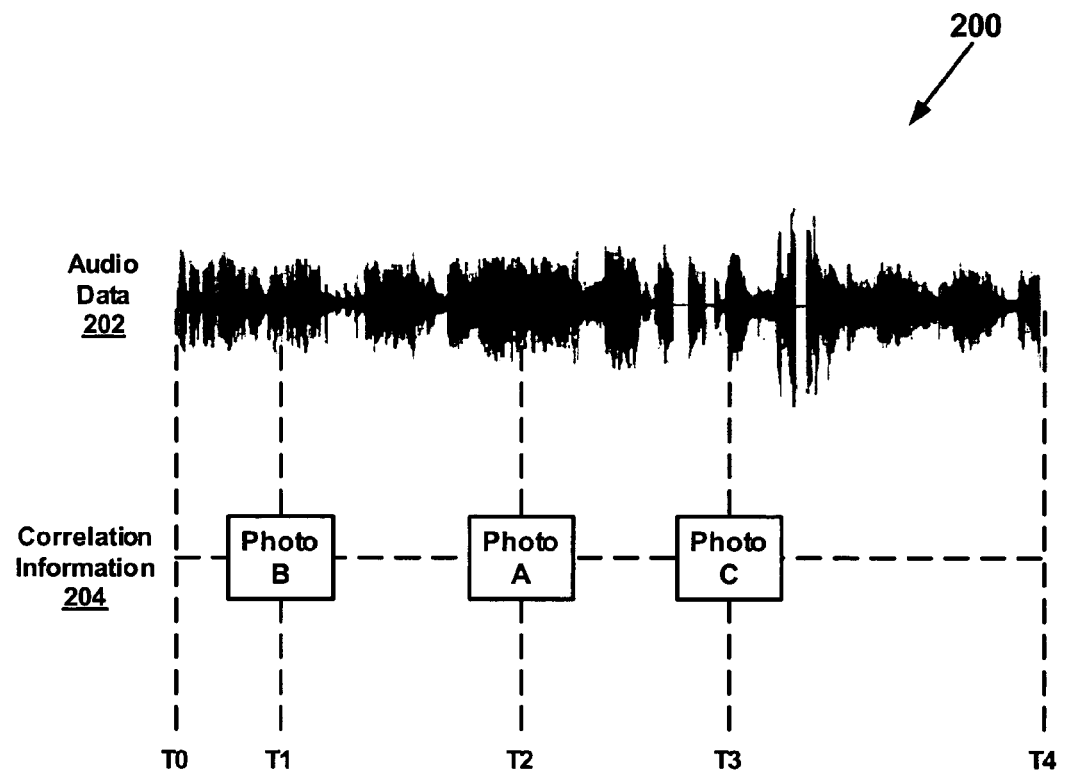
FIG. 2 is a diagram of an exemplary process of associating audio data with visual media to create a story mail, according to one embodiment.

FIG. 2 is a diagram of an exemplary process of associating continuous audio data with visual media to create a story mail, according to one embodiment. As depicted in FIG. 2, the visual media is electronic photos (B, A, C). In process 200, a person may associate photos (B, A, C) with the audio data 202, according to one embodiment. Voice mail may be used to associate the photos (B, A, C) with the audio data 202, according to another embodiment. The person may specify correlation information 204 to associate the photos (B, A, C) with the audio data 202, according to one embodiment.

According to one embodiment, a story mail includes, visual media, such as photos (B, A, C), at least one continuous audio data 202, and synchronization information that is generated based on user specified correlation information 204 that describes a correlation for presenting the visual media with the continuous audio data 202. Any method of correlating visual media, such as photos (B, A, C), with continuous audio data 202 at points where the continuous audio data 202 pertains to the photos 202 to create a story mail may be used. The correlation information 204 may be an order and/or times (T1, T2, T3) that the photos (B, A, C) are associated with the audio data 202, according to one embodiment. For example, a person may have taken a trip that they want to share their trip with a friend. As the person talks about their experiences on the trip, a receiver 140 (FIG. 1) may receive audio data 202. Further, the person may have uploaded electronic versions of photos (A, B, C) that they took while on the trip. As they describe their trip, the person may associate photos (A, B, C) with the audio data 202 by specifying correlation information 204 to create a story mail.

The person may correlate the photos (B, A, C) with the audio data 202 at points where audio data 202 pertains to the photos (B, A, C) to create a story mail that describes and illustrates their trip. For example, as depicted in FIG. 2, the audio data 202 starts at time T0. At time T1, the person may be describing their camp site and photo B is a picture of their camp site so they select the thumbnail B' (FIG. 1) that represents photo B at time T1. At time T2, they may be describing a mountain that they took a photo A of so they select thumbnail A' (FIG. 1) at time T2, and so on. At time T4, the person stops speaking and the audio data 202 ends. According to one embodiment, audio data 202 is continuous. For example, a communications device 100 may receive and record audio data 202 continuously from time T0 till time T4. This audio data 202 may be associated with one video clip, according to one embodiment.

In the above example, communications device 100 may be either a story mail transmitting device and/or a story mail receiving device that is installed as hardware and/or software on a communications device 100, as will become more evident. A person may use one communications device 100 with its associated story mail transmitting device to transmit a story mail to a friend who can use another communications device 100 with its associated story mail receiving device to listen to the audio data 202 that describes the trip and view the photos (B, A, C) that depict the trip. In one embodiment, a story mail may be transmitted over a network.

Although, communications device 100 depicts thumbnails 122 for photos (A, B, C) in the order of A', B', C', a person may specify any order that they want to associate the photos with the audio data 202. Further, the person does not need to associate all of the photos associated with the handheld communications device with the audio data 202 when creating a story mail.

According to one embodiment, a user may specify correlation information 204 as receiver 140 (FIG. 1) receives audio data 202. For example, a person may be describing photos (A, B, C). In this case, a receiver 140 may be receiving audio data 202 that describes the photos (A, B, C). As the person is describing the photos, the person may also be clicking on thumbnails A', B', C' indicating at what time they are describing any particular photo. In this example, the communications device 100 may be recording the audio data 202 as the photos (A, B, C) are being correlated with the audio data 202. According to another embodiment, the user may specify correlation information 204 while listening to audio data 202 that was previously received. For example, a person may first record the description of their trip, which includes the description of photos A, B, C of the trip. After the person recorded the description of their trip, e.g., audio data 202, the person may listen to their recording, e.g., audio data 202, and at the appropriate times, click on thumbnails A', B', C' to indicate that they were describing a particular photo at that time in the description, e.g., audio data 202.

On handheld communications devices, such as cell phones and camera phones, the data channel and the voice channel are usually separate. Although it is possible to transmit voice over a computer network using VoIP, the protocols for the voice and data channels are still typically different and the two channels can be considered separate and independent. As a result, the audio data 202 of a story mail may be transmitted over the dedicated voice channel, as will be described in more detail. Further, the visual media, such as photos, of a story mail may be transmitted over the separate data channel, as will also be described in more detail. Although the audio data 202 and the visual media associated with a story mail may be transmitted separately, they may still be synchronized together, for example using synchronization information, so that the audio data 202 corresponds with the visual media being displayed.

According to one embodiment, a voice interface may be used to create, transmit, and/or present a story mail. For example, a speaker 150 may audibly present a list of options that a user may choose from. One of the options that the user hears may be, for example, a "2" for creating a story mail. The user may respond by saying "2", which a receiver 140 receives, to indicate the user intends to create a story mail. In another embodiment, a graphical interface may be implemented using a screen 120. The screen 120 may display a list of options that a user may choose from. One of the displayed options may be, for example, a "2" for creating a story mail. The user may respond by clicking on the number "2" on the keypad 130 to create a story mail.

The audio data 202 and the visual media of a story mail are associated with each other, according to one embodiment, so that the entire story mail may be retrieved. For example, a file system with one folder per story mail may be used according

Figure 3:
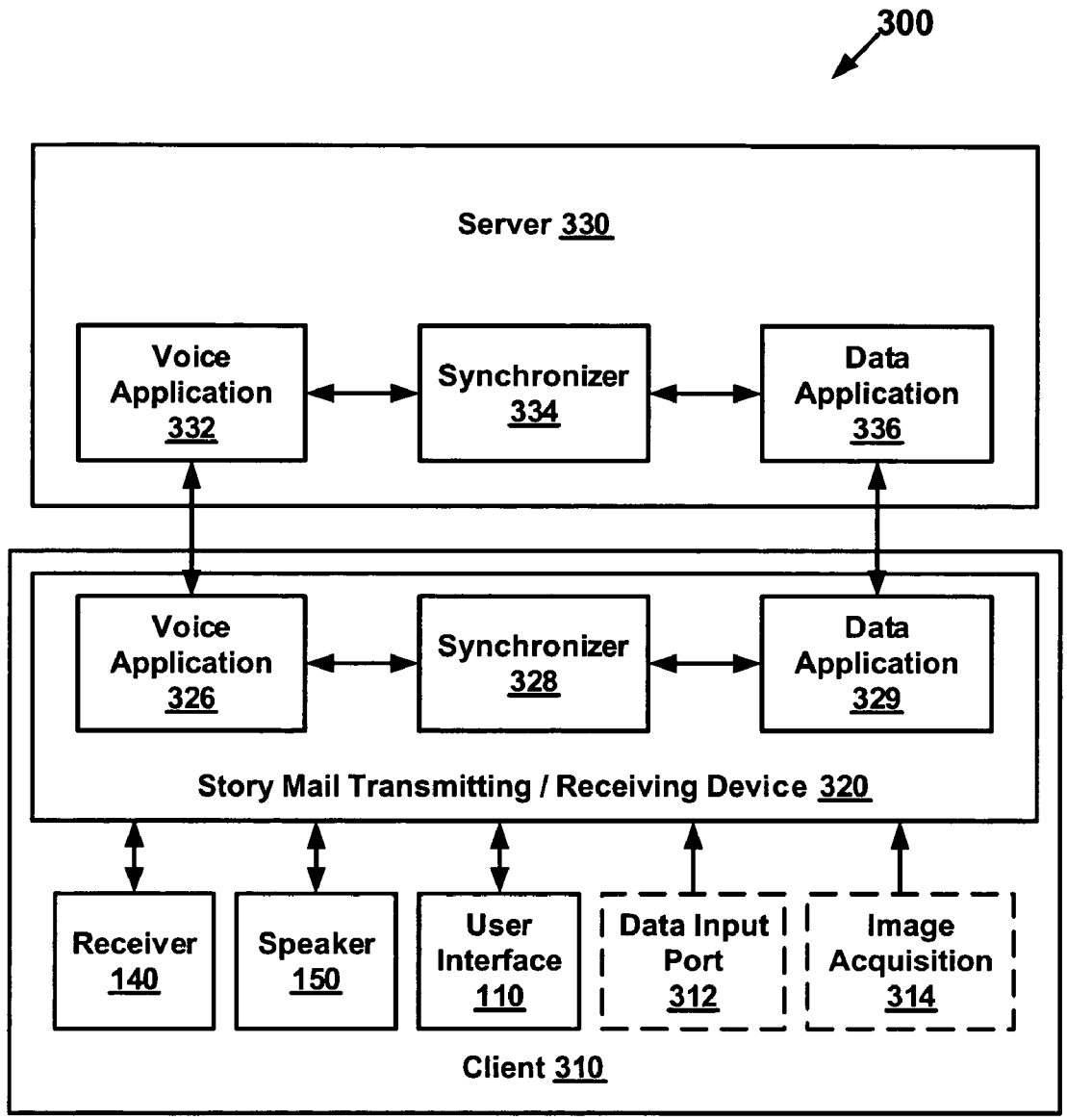
FIG. 3 is a block diagram of an exemplary communications system for communicating a story mail using a client that can transmit and receive storymails, according to an embodiment.

Detailed Description of a Communications System Using Clients that can Transmit and Receive Storymails FIG. 3 is a block diagram of an exemplary communications system for communicating a story mail using clients that can transmit and receive storymails, according to an embodiment. The blocks in FIG. 3 can be arranged differently than as illustrated, and can implement additional or fewer features than what are described herein.

As depicted in FIG. 3, system 300 depicts a client 310 for transmitting and/or receiving story mails and a server 330 for communicating the story mail between clients, such as client 310. Client 310 includes a receiver 140 (FIG. 1), a speaker 150 (FIG. 1), a user interface 110 (FIG. 1), an optional data input port 312, an optional image acquisition 314, and a story mail transmitting/receiving device 320 that may be used for transmitting and/or receiving story mails.

Storymail transmitting/receiving device 320 may be a part of a communications device 100 (FIG. 1) by installing software and/or hardware onto a communications device 100. The story mail transmitting/receiving device 320 includes a voice application 326, a synchronizer 328, and a data application 329.

Visual media, such as electronic photos, may be uploaded onto client 310 using the data input port 312, according to one embodiment. For example, a memory stick may be used for uploading visual media onto client 310 using data input port 312. An image acquisition component 314 may be used to take electronic photos, according to another embodiment, for example where client 310 is a camera phone.

The voice application 326 on the client 310 may receive audio data 202 (FIG. 2) from receiver 140 (FIG. 1) and transmit the audio data 202 (FIG. 2) to server 330. The voice application 332 on server 330 may receive the transmitted audio data 202 (FIG. 2). The data application 329 on the client 310 may receive visual media, such as electronic photos, from either an optional data input port 312 or from an optional image acquisition component 314 and transmit the visual media to server 330. The data application 336 on the server 330 may receive the transmitted visual media. Server 330 may transmit the audio data 202 (FIG. 2) and the visual media from voice application 332 and data application 336 to a second client that is analogous to client 310. In this case, the voice application 326 and the data application 329 may receive the audio data 202 (FIG. 2) and the visual media at the second client's respective voice application 332 and data application 336.

Synchronizer 328 on the client 310 may either create synchronization information that is based on user specified correlation information 204 (FIG. 2) or may use the synchronization information to present audio data 202 (FIG. 2) with visual media, such as photos A, B, C (FIG. 2), according to one embodiment. The synchronizer 334 on the server 330 may create synchronization information that is based on user specified correlation information 204 (FIG. 2) in conjunction with or instead of synchronizer 328, according to another embodiment.

Data applications 329, 336 may be used to communicate synchronization information, according to one embodiment between clients and servers. Voice applications 326, 332 may be used to communicate synchronization information, between clients and servers, according to another embodiment.

Figure 4:
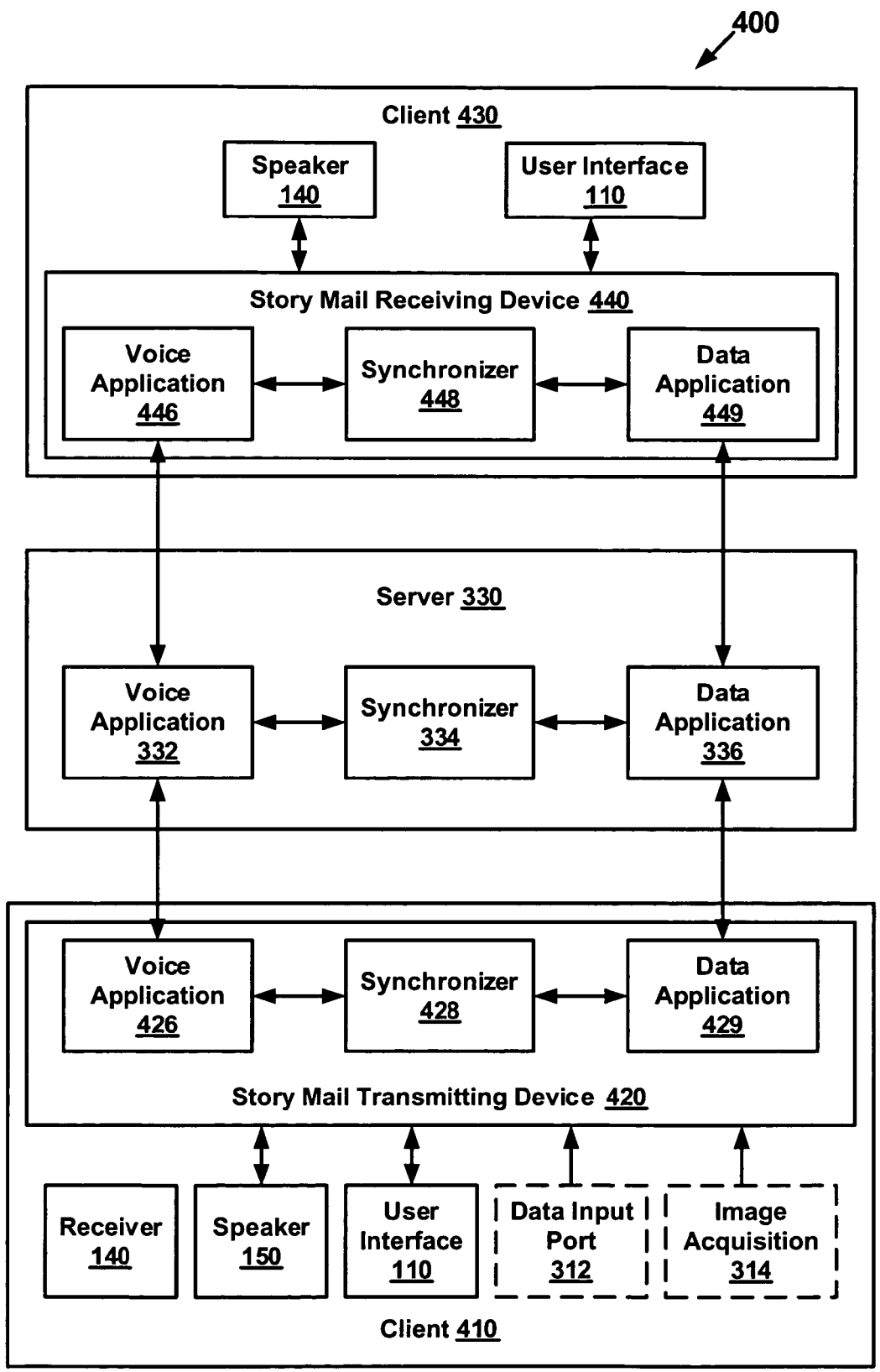
FIG. 4 is a block diagram of an exemplary communications system for communicating a story mail using separate clients for transmitting and receiving story mails, according to another embodiment.

Detailed Description of a Communications System Using Transmitting and Recieving Storymail Devices FIG. 4 is a block diagram of an exemplary communications system for communicating a story mail using transmitting and receiving story mail devices, according to another embodiment. The blocks in FIG. 4 can be arranged differently than as illustrated, and can implement additional or fewer features than what are described herein.

As depicted in FIG. 4, system 400 depicts a client 410 that transmits story mails using a story mail transmitting device 420, another client 430 that receives story mails using a story mail receiving device 440, and a server 330 that communicates the story mails between the story mail transmitting device 420 and the story mail receiving device 440.

For example, the voice application 426 and data application 429 transmit the audio data 202 (FIG. 2) and visual media respectively associated with a story mail from story mail transmitting device 420 to server 330. Voice application 332 and data application 336 of server 330 receive the audio data 202 (FIG. 2) and the visual media. The voice application 332 and the data application 336 of server 330 respectively transmit the audio data 202 (FIG. 2) and visual media to the receiving client 430. The voice application 446 and the data application 449 of story mail receiving device 440 receive the audio data 202 (FIG. 2) and the visual media respectively from server 330.

Either synchronizer 428 on the client 410 and/or synchronizer 334 on the server 330 may create synchronization information that is based on user specified correlation information 204 (FIG. 2), according to one embodiment. Synchronizer 448 on the receiving client 430 may use the synchronization information to present audio data 202 (FIG. 2) with visual media, such as photos A, B, C (FIG. 2), according to another embodiment.

Data applications 429, 336, 449 may be used for communicating synchronization information in a system 400, according to one embodiment. Voice applications 426, 332, 446 may be used for communicating synchronization information in a system 400, according to another embodiment.

Story mail devices 420, 440 may be a part of a communications device, such as communications device 100 (FIG. 1), by installing software and/or hardware onto a communications device 100.

Figure 5:
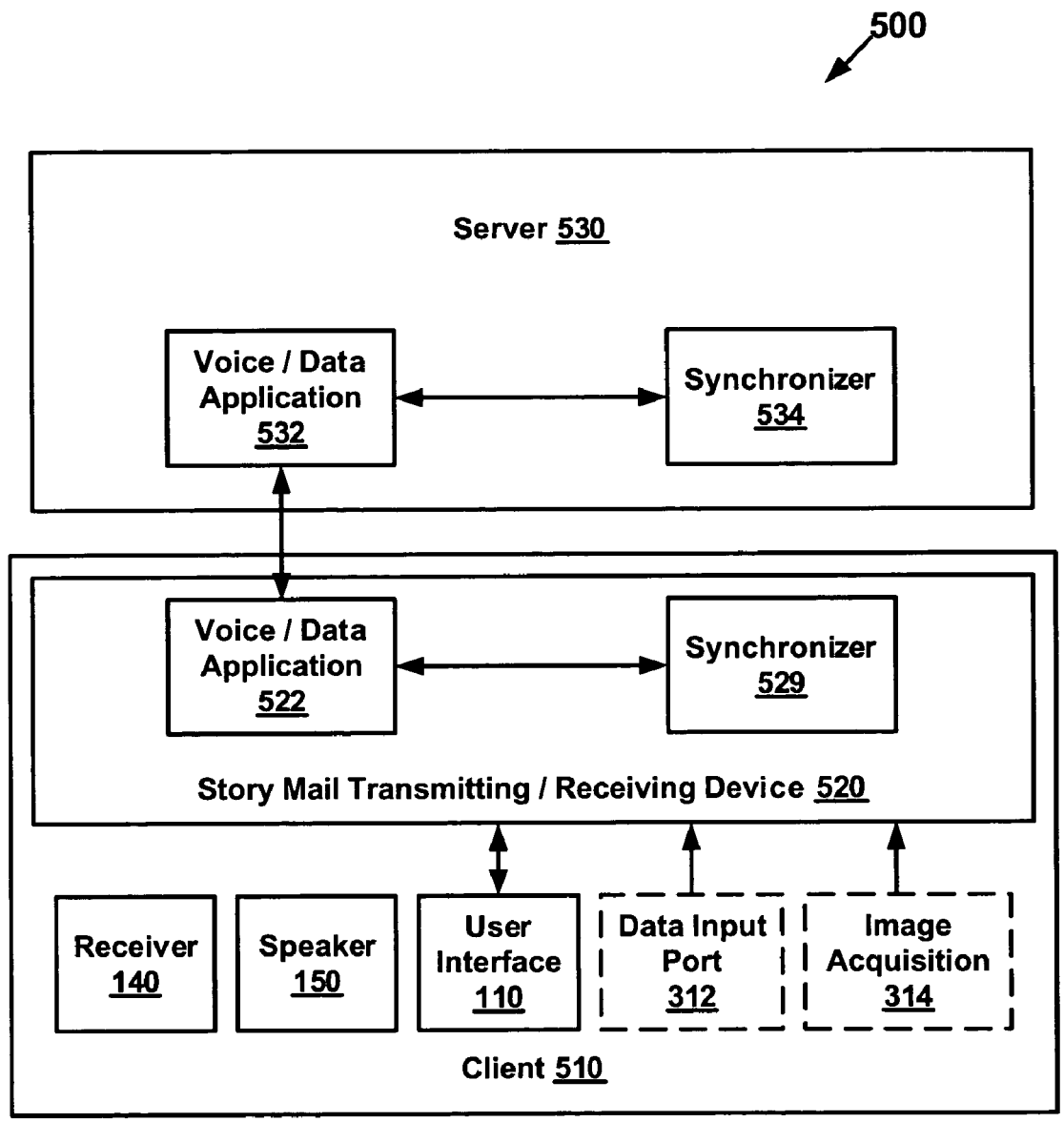
FIG. 5 is a block diagram of an exemplary communications system for communicating a story mail using Voice Over Internet Protocol, according to another embodiment.

A Detailed Description of a Communications System Using Voice Over Internet Protocol FIG. 5 is a block diagram of an exemplary communications system for communicating a story mail using Voice Over Internet Protocol, according to another embodiment. The blocks in FIG. 5 can be arranged differently than as illustrated, and can implement additional or fewer features than what are described herein.

As depicted in FIG. 5, system 500 depicts a client 510 for transmitting and/or receiving story mails and a server 530 for communicating the story mail between clients, such as client 510, using VoIP. Client 510 includes a story mail transmitting/receiving device 520 that may be used for transmitting and/or receiving story mails. Story mail transmitting/receiving device 520 may be a part of a communications device 100 (FIG. 1) by installing software and/or hardware onto a communications device 100. Story mail transmitting/receiving device 520 includes a voice/data application 522 and a synchronizer 524. Server 530 includes a voice/data application 532 and a synchronizer 534.

As already stated, in one embodiment, clients, such as client 510, and/or the server 330 may use VoIP. In this case, the data and voice applications may be combined into the same application, such as voice/data application 522 which is associated with client 510 and the voice/data application 532 which is associated with server 530.

Synchronizer 524 on client 510 may either create synchronization information that is based on user specified correlation information 204 (FIG. 2) or may use the synchronization information to present audio data 202 (FIG. 2) with visual media, such as photos A, B, C, (FIG. 2), according to one embodiment. The synchronizer 534 associated with server 530 may create synchronization information that is based on user specified correlation information 204 (FIG. 2) in conjunction with or instead of synchronizer 524, according to another embodiment.

Transmitting the audio data 202 (FIG. 2) and the visual media on separate channels allows for different devices to play audio data 202 (FIG. 2) and display the visual media. For example, the audio data 202 (FIG. 2) may be listened to on a landline phone and the visual media may be displayed on a television set. To accomplish this, the device used for displaying the visual media may be registered manually with a server 330, 530 and/or a story mail device 320, 420, 440, 520. The registration may alternatively be accomplished automatically, or semi-automatically using existing discovery mechanisms such as Bluetooth or infrared-based discovery.

A server 330, 510 may provide a conceptually independent mailbox service for each user, according to one embodiment. Each mailbox service may be able to transmit a story mail (e.g., voice mail) to a mailbox of the other users.

Servers 330, 510 may be single server machines hosting all of the mailboxes in a system 300, 400, 500, according to one embodiment. Servers 330, 510 may be distributed across multiple server machines, according to another embodiment. Each server machine may host a subset of the mailboxes, according to yet another embodiment.

According to one embodiment, a voice channel is used to communicating information between voice applications 326, 426, 332, 446, 522, 532. According to another embodiment, a data channel is used to communicate information between data applications 329, 336, 429, 449, 522, 532.

Protocols and Platforms

According to one embodiment, voice applications on clients may be a Simple Initiated Protocol (SIP) user agent and the voice application on the server may be an HP™Open Call Media Platform (OCMP) Oclet. According to another embodiment, the voice applications may use Global System for Mobile Communications (GSM), Real-Time Transport Protocol (RTP), Voice Over Internet Protocol (VoIP), Code Division Multiple Access (CDMA), Public Switched Telephone Network (PSTN), Integrated Services Digital Network (ISDM), Universal Mobile Telecommunications System (UMTS), or Time Division Multiple Access (TDMA).

According to one embodiment, the data applications on the clients and the server may use the Simple Mail Transport Protocol (SMTP). According to another embodiment, the data applications on the clients and the server may use Simple Mail Transport Protocol (SMTP), HyperText Transport Protocol (HTTP), File Transfer Protocol (FTP), Code Division Multiple Access (CDMA), Public Switched Telephone Network (PSTN), Integrated Services Digital Network (ISDM), Universal Mobile Telecommunications System (UMTS), Time Division Multiple Access (TDMA), General Packet Radio Service (GPRS) or Global System for Mobile Communication (GSM). HTTP may be used to display visual representations derived from URLs.

The clients and the servers may use Simple Object Access Protocol (SOAP) Remote Method Invocation (RMI) to synchronize the recording and/or the playing of the visual media with the audio data 202 (FIG. 2), according to one embodiment. Synchronizers may use Extensible Markup languages (XML), Synchronized Multimedia Integration Language (SMIL) or Music Photos Video (MPV) to format (e.g., create) and/or use synchronization information, according to another embodiment.

Dual Tone Multi-Frequency (DTMF) may be used for communicating data, which may represent commands, between a client that is installed on a communications device, such as communications device 100, and a server, according to one embodiment. The data may be communicated over a voice channel, according to one embodiment, or a data channel, according to another embodiment. For example, the user may enter data and/or commands with a microphone, such as receiver 140 (FIG. 1) or a keypad 130 (FIG. 1).

Operational Examples

Figure 6A:
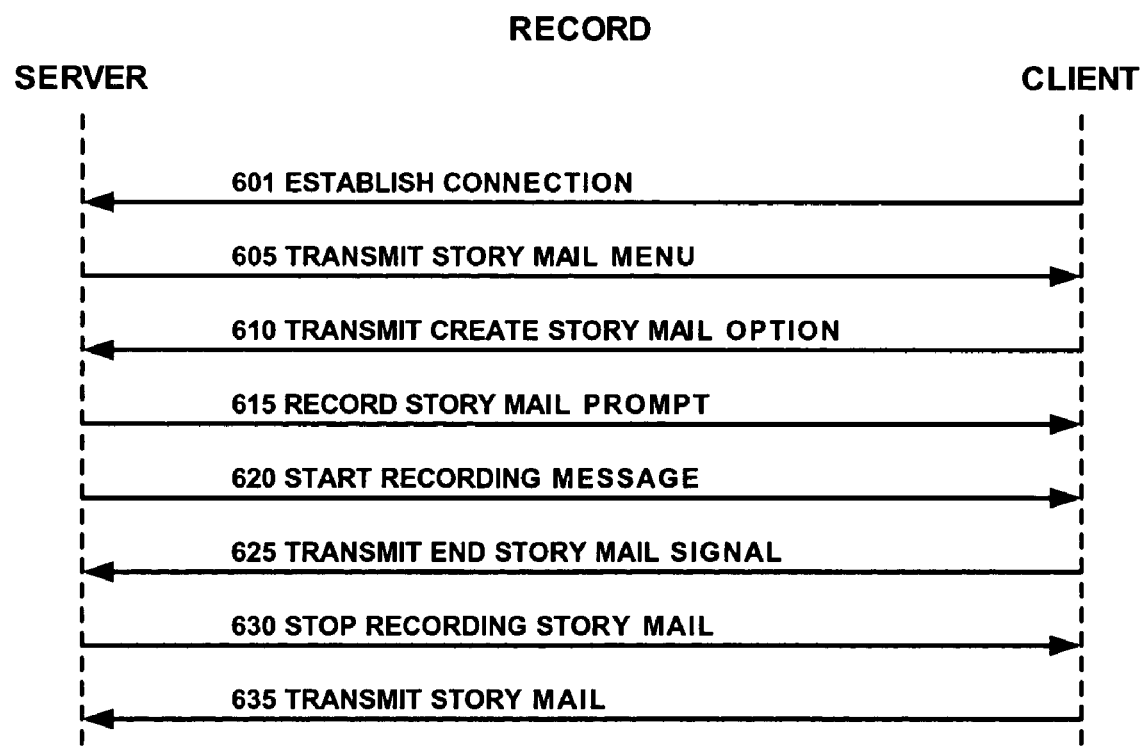
FIGS. 6A and 6B depict flowcharts for communicating a story mail between communications devices, according to embodiments of the present invention The drawings referred to in this description should not be understood as being drawn to scale except if specifically noted.
Figure 6B:
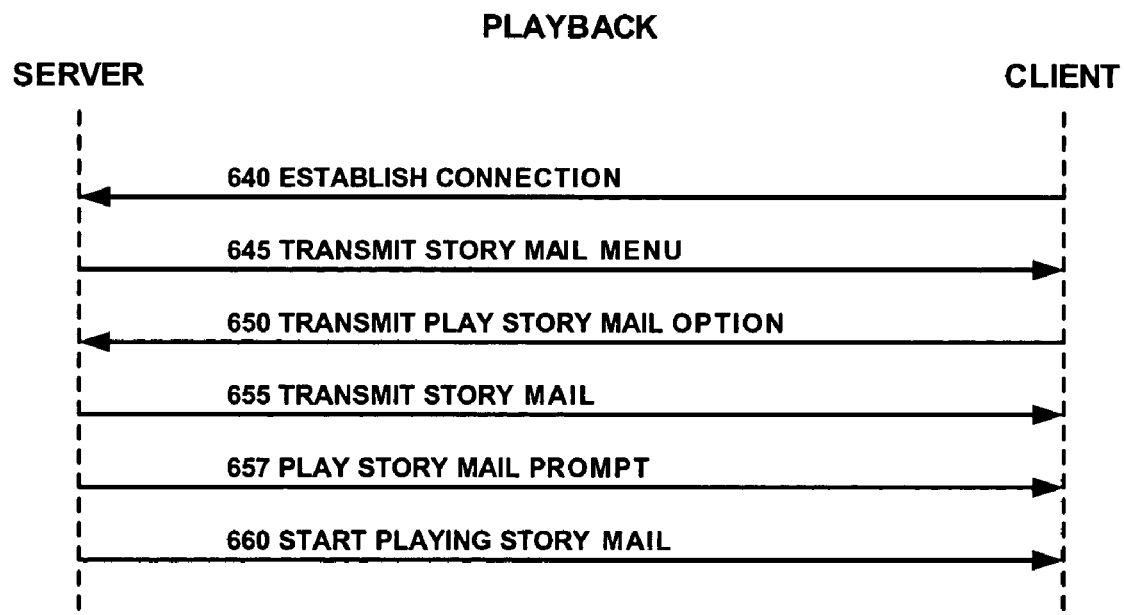

FIGS. 6A and 6B depict flowcharts for communicating a story mail between communications devices, according to embodiments of the present invention. Although specific steps are disclosed in the flowcharts, such steps are exemplary. That is, embodiments of the present invention are well suited to performing various other steps or variations of the steps recited in flowcharts. It is appreciated that the steps in the flowcharts may be performed in an order different than presented, and that not all of the steps in the flowcharts may be performed. All of, or a portion of, the embodiments described by flowcharts can be implemented using computer-readable and computer-executable instructions which reside, for example, in computer-usable media of a communications device 100 (FIG. 1) or like device.

For the purposes of illustration, the discussion of flowcharts shall refer to: (1) the communications device depicted in FIG. 1, (2) the process depicted in FIG. 2, (3) the communications system depicted in FIG. 4, and (4) the synchronization information depicted in Table 1 below. For the purposes of illustration, assume that user specified correlation information 204 (FIG. 2) includes an order that photos A, B, C were specified by a user, which in this operational example is Peter, and times that the user specified the photos A, B, C. In this operational example, the photos A, B, C will be displayed to another user, John, in the order that Peter specified.

TABLE 1

| SYNCHRONIZATION INFORMATION | |
|---|---|
| TIMES THAT VISUAL MEDIA WERE SPECIFIED | AN ORDER VISUAL MEDIA WAS SPECIFIED |
| T1 = T0 + 3 seconds | B |
| T2 = T0 + 8 seconds | A |
| T3 = T0 + 16 seconds | C |

Further, for the purposes of illustration, the discussion of the flowcharts shall assume that voice applications 426, 446 on clients 410, 430 are Simple Initiated Protocol (SIP) user agents, that the voice application 332 on the server 330 is an HP™Open Call Media Platform (OCMP) Oclet, that SMTP is used by the data applications 429, 336, 449 associated with the clients 410, 430 and the server 330, that the clients 410, 430 and the server 330 uses Simple Object Access Protocol (SOAP) Remote Method Invocation (RMI) to synchronize the recording and/or the playing of the story mail, that the synchronization information depicted in Table 1 is formatted using Synchronized Multimedia Integration Language (SMIL), that story mail devices 420, 440 are installed as hardware and/or software on communications devices, such as communications device 100, and that Dual Tone Multi-Frequency (DTMF) is used for communicating keypad 130 entered data between clients 410, 430 and a server 330.

Peter who is on vacation in Yosemite National Park uses his camera phone (client 410) (e.g., camera phone (client 410) depicted on FIG. 4) to take pictures, which are represented by thumbnails 122 (FIG. 1) on the screen 120 (FIG. 4) of his camera phone (client 410). Peter wants to share his experiences with his friend John.

Referring to FIG. 6A, in step 601, a connection between a server 330 and a camera phone (client 410) is established. For example, Peter dials the number of his multimedia voicemail service and is prompted for his password. As a result, a connection may be established between server 330 and camera phone (client 410). A voice application 426 (e.g., SIP user agent) on camera phone (client 410) and a voice application 332 (e.g., OCMP Oclet) on server 330 may be used to establish the connection.

In step 605, server 330 transmits a "story mail menu" to camera phone (client 410). For example, Peter's voicemail service may transmit menus, one of which is the "story mail menu," that offers multiple options for Peter to choose from. In one embodiment, Peter may use a voice interface to interact with his camera phone. For example, Peter may hear the options associated with the "story mail menu" over the speaker 150 associated with his camera phone (client 410. In this case, Peter may hear, for example, "choose option 2 to create a story mail," (referred to hereinafter as the "create story mail option"). Peter may say "2", which is received by the receiver 140 of his camera phone to create a story mail.

In another embodiment, Peter may use a graphical interface to interact with his camera phone. For example, the screen 120 (FIG. 1) associated with Peter's camera phone (client 410) may display the "story mail menu," which includes, for example, an option 2 for creating a story mail, e.g., the "create story mail option." Peter may use the keypad 130 of his camera phone to choose option 2.

A voice application 332 (e.g., OCMP Oclet) on server 330 and a voice application 426 (e.g., SIP user agent) on camera phone (client 410) may use DTMF to transmit data that represents Peter's choice to present the "story mail menu" to Peter.

In step 610, camera phone (client 410) transmits the "create story mail option" to the server 330. For example, Peter chooses the "create story mail option" using either the voice interface or the graphical interface. The voice application 426 (e.g., SIP user agent) on camera phone (client 410) and the voice application 332 (e.g., OCMP Oclet) on server 330 may use DTMF to transmit data that represents the "create story mail option" that Peter chose.

In step 615, server 330 prompts camera phone (client 410) with the "record story mail prompt message." The "story mail prompt message" may be a voice message that Peter hears. For example, a speaker 150 (FIG. 1) on Peter's camera phone (client 410) may say "Start recording your message now." A voice application 332 (e.g., OCMP Oclet) on server 330 may transmit the "record story mail prompt message" to a voice application 426 (e.g., SIP user agent) on camera phone (client 410).

In step 620, server 330 sends "start recording message" to camera phone (client 410). For example, server 330 may cause camera phone (client 410) to start recording Peter's story mail by sending a "start recording message" to camera phone (client 410). The "story mail prompt message" (refer to step 615) and the "start recording message" (refer to step 620) are transmitted almost simultaneously from server 330 to camera phone (client 410), according to one embodiment. SOAP RMI interfaces on server 330 and camera phone (client 410) may be used to initiate the transmission of the "start recording message."

Peter may now start recording audio data 202 (FIG. 2) associated with his story mail that describes his trip. While recording the audio data 202 (FIG. 2), Peter may browse through the photos displayed on the screen 120 (FIG. 1) of his camera phone (client 410) and select the photos he wants to illustrate his story with. For example, Peter's camera phone (client 410) may start recording the audio data 202 (FIG. 2) at time T0 (FIG. 2) as Peter starts describing his trip. At time T1, which is 3 seconds after Peter starts to describe his trip, Peter clicks on the thumbnail B' (FIG. 2) to indicate that photo B (FIG. 2) illustrates the part of his trip that he is describing at that point. At time T2, which is 8 seconds after Peter starts to describe his trip, Peter clicks on thumbnail A' (FIG. 1) to indicate that photo A (FIG. 2) illustrates the part of his trip that he is describing at that point, and so on by clicking on thumbnail C' (FIG. 1) at time T3, which is 16 seconds after Peter starts talking to select photo C (FIG. 2). At time T4, Peter stops describing his trip By clicking on the thumbnails B', A', C' (FIG. 1) at 3 seconds (T1), 8 seconds (T2) and 16 seconds (T3) respectively after Peter starts describing his trip (T0), Peter specifies correlation information 204 (FIG. 2) that describes a correlation for presenting visual media, such as photos A, B, C, with continuous audio data 202, according to one embodiment. According to another embodiment, a synchronizer 428 associated with camera phone (client 410) generates synchronization information, such as that depicted in Table 1, based on the user specified correlation information 204 (FIG. 2) that describes the correlation for presenting the visual media, such as photos A, B, C (FIG. 2), with the continuous audio data 202 (FIG. 2), for example, at a later time, as will be explained in more detail. According to yet another embodiment, a synchronizer 334 associated with server 330 may generate the synchronization information in conjunction or instead of the synchronizer 428 associated with the camera phone (client 410). According to one embodiment, audio data 202 is continuous. For example, Peter's camera phone may be continually receiving and recording audio data 202 from time T0 till time T4 when Peter stops describing his trip. This audio data 202 may be associated with one video clip, according to one embodiment.

In step 625, camera phone (client 410) transmits an "end story mail signal" to server 330. For example, when Peter finishes recording the audio data 202 (FIG. 2) that describes his trip and selecting photos A, B, C that illustrate his trip, he may either press a button on the keypad 130 (FIG. 1) of his camera phone (client 410) or say a command, such as "end story mail", which may be received by receiver 140 indicating that he has finished his story mail. Data representing the "end story mail signal" may be transmitted from a voice application 426 (e.g., SIP user agent) associated with camera phone (client 410) to a voice application 332 (e.g., OCMP Oclet) associated with server 330 using DTMF.

In step 630, server 330 transmits a "stop recording story mail" to camera phone (client 410). For example, server 330 may transmit a "stop recording message" to camera phone (client 410) in response to receiving the "end story mail signal" in step 625. A SOAP RMI interfaces on server 330 and camera phone (client 410) may be used to initiate the transmission of the "stop recording message."

In step 635, camera phone (client 410) transmits the story mail to server 330. For example, the synchronization information depicted in Table 1, the audio data 202 (FIG. 2) and the photos A, B, C may be transmitted from camera phone (client 410) to server 330. The audio data 202 (FIG. 2) may be transmitted from a voice application 426 (e.g., SIP user agent) associated with the camera phone (client 410) to a voice application 332 (e.g., OCMP Oclet) associated with the server 330. The photos A, B, C and the synchronization information depicted in Table 1 may be transmitted from the data application 429 on camera phone (client 410) to the data application 336 on the server 330 using SMTP. SOAP RMI interfaces on camera phone (client 410) and server 330 may be used to initiate the transmission of the synchronization information depicted in Table 1.

Some time later, John checks his cell phone (client 430) and sees that he has received a story mail that has photos A, B, C and audio data 202 (FIG. 2) associated with it. John decides to listen to the audio data 202 (FIG. 2) using the speaker 150 of his cell phone (client 430) and view the photos A, B, C using the screen 120 of his cell phone (client 430).

Referring to FIG. 6B in step 640, cell phone (client 430) establishes connection with server 330. For example, John may use his voice mail service to log onto the server 330. As a result, a connection may be established. A voice application 446 (SIP user agent) cell phone (client 430) and a voice application 332 (OCMP Oclet) on server 330 may be used to establish the connection between the cell phone (client 430) and the server 330.

In step 645, server 330 transmits a "story mail menu" to a cell phone (client 430). For example, John's voicemail service may transmit menus, one of which is the "story mail menu," that offer multiple options for John to choose from. As with Peter, John may use either a voice interface or a graphical interface to interact with his cell phone. John may use either of these interfaces to choose a "play story mail option" from the "story mail menu." A voice application 332 (OCMP Oclet) on server 330 may be used to transmit the "story mail menu" to a voice application 446 (SIP user agent) on cell phone (client 430).

In step 650, a cell phone (client 430) transmits a "play story mail option" to server 330. For example, John may use either the receiver 140 or the keypad 150 of his cell phone (client 430) to choose the "play story mail option." Data representing this choice may be transmitted from a SIP agent associated with cell phone (client 430) to a voice application 332 (OCMP Oclet) associated with server 330 using DTMF.

In step 655, server 330 transmits story mail to a cell phone (client 430). For example, the synchronization information depicted in Table 1, the audio data 202 (FIG. 2) and the photos A, B, C may be transmitted from server 330 to the cell phone (client 430). The audio data 202 (FIG. 2) may be transmitted from a voice application 332 (e.g., OCMP Oclet) associated with server 330 to a voice application 446 (SIP user agent) associated with the cell phone (client 430). The photos A, B, C and the synchronization information depicted in Table 1 may be transmitted from the data application 336 associated with server 330 to the data application 449 associated with the cell phone (client 430) using SMTP. SOAP RMI interfaces on cell phone (client 430) and server 330 may be used to initiate the transmission of the synchronization information depicted in Table 1.

In step 657, server 330 prompts cell phone (client 430) with a "play story mail prompt message." The "play story mail prompt message" may be a voice message that John hears. For example, the speaker 150 of John's cell phone (client 430) may say "your story mail will start to play." An OCMP Oclet on server 330 may transmit the "play story mail prompt message" to a SIP user agent on the cell phone (client 430).

In step 660, server 330 transmits a "start playing story mail" to the cell phone (client 430). For example, server 330 may cause the cell phone (client 430) to start playing the story mail that Peter sent to John by transmitting a "start playing message" to cell phone (client 430). The "play story mail prompt message" (refer to step 657) and the "start playing message" (refer to step 660) are transmitted almost simultaneously from server 330 to cell phone (client 430), according to one embodiment. SOAP RMI interfaces on server 330 and cell phone (client 430) may be used to initiate the transmission of the "start playing message."

A synchronizer 448 associated with cell phone (client 430) may use synchronization information, such as that depicted in Table 1, for presenting visual media, such as photos A, B, C (FIG. 2) with audio data 202 (FIG. 2), according to one embodiment. For example, the synchronizer 448 may start playing the audio data 202 (FIG. 2) for John to listen to the speaker 150 (FIG. 4) of his cell phone (client 430) at time T0. When 3 seconds have elapsed from time T0, the synchronizer 448 may cause photo B to be displayed on the screen 120, when 8 seconds have elapsed, the synchronizer 448 may cause photo A to be displayed on the screen 120 of his cell phone (client 430), and so on with photo C when 16 seconds have elapsed.

Although the above operational examples described transmitting the synchronization information, the audio data 202 (FIG. 2), and the visual media at step 635, these pieces of information may be transmitted any time during or after step 620 has been initiated. For example, although not all of the synchronization information, the audio data 202 (FIG. 2) and the visual media have been completely obtained from the user creating the story mail until step 630 is completed, a client 310, 410, 510 may begin transmitting this information prior to the completion of the story mail.

Although the above operation example described John using a cell phone (client 430) to listen to the audio data 202 over the speaker 150 and view the photos using the screen 120 of his cell phone (client 430), John could have instead listened to the audio data 202 using his land line phone and viewed the photos using his television. In this case, John may have registered his television with a story mail receiving device 440 that is installed on his line phone, as already described herein.

Alternatives and Extensions

Although the above embodiments and examples described referred to a story mail that included one continuous audio data 202, a story mail may include more than one continuous audio data 202. In this case, more than one visual representation, such as more than one photo, may be associated with each of the continuous audio datas so that each the continuous audio datas describe the visual representations associated with it.

CONCLUSION

By extending a voice mail service model in embodiments of the present invention, users may communicate with story mail transmitting and/or receiving devices using a voice interface 110 (FIG. 1) which is intuitive and familiar to the users. Therefore, embodiments of the present invention do not require any text typing, which is awkward using a handheld device, such as a cell phone.

Further, by extending a voice mail service model in embodiments of the present invention, standard land line phones or mobile phones without color displays can still participate in sharing story mails. The audio data of a story mail may be received by their phone, while the corresponding visual media (e.g., photos, video clips, etc) may be received by a networked display device, such as a personal computer (PC), a digital picture frame, or a television.

By extending a voice mail model in embodiments of the present invention, users are allowed to speak freely and continuously, with the speech synchronized only loosely and informally with the visual media. Further, multiple visual representations, such as photos, video clips, etc., may be associated with continuous audio data that describes the multiple visual representations to create a story mail.

Although most of the descriptions herein that pertain to using a camera phone to create a story mail, other types of communications devices may be used to create a story mail. For example, visual representations, such as photos, etc. may be uploaded onto a communications device, such as a PDA, cell phone, or PC, etc. and used to create the story mail on the communications device.

What is claimed is:

1. A system for communicating a story mail between communications devices that extends voice mail, the system comprising:
   a story mail transmitting device for transmitting a story mail that is associated with synchronization information, wherein said synchronization information is generated based on user specified correlation information that describes a correlation for presenting said story mail, said story mail including correlated visual media with continuous audio data;
   a story mail receiving device that uses said synchronization information to present said visual media and said continuous audio data associated with said story mail, said story mail receiving device comprising:
   a voice application for receiving continuous audio data at said story mail receiving device;
   a data application for receiving visual media at said story mail receiving device; and
   a synchronizer for using synchronization information that was generated based on user specified correlation information that describes a correlation for presenting said visual media with said continuous audio data;
   wherein at least one of said story mail transmitting device and said story mail receiving device is handheld; and
   wherein the presentation of said visual media results in the presentation of more than one visual representation.

2. The system of claim 1, wherein said story mail transmitting device further comprises:
   a voice application for transmitting continuous audio data from said story mail transmitting device;
   a data application for transmitting visual media from said story mail transmitting device; and
   a synchronizer that generates synchronization information based on user specified correlation information that describes a correlation for presenting said visual media with said continuous audio data.

3. The system of claim 2, wherein said voice application uses one or more protocols consisting of Session Initiated Protocol (SIP), Global System for Mobile Communications (GSM), Real-Time Transport Protocol (RTP), and Voice over Internet Protocol (VoIP), Code Division Multiple Access (CDMA), Public Switched Telephone Network (PSTN), Integrated Services Digital Network (ISDM), Universal Mobile Telecommunications System (UMTS), and Time Division Multiple Access (TDMA), and wherein said data application uses one or more protocols consisting of Simple Mail Transport Protocol (SMTP), HyperText Transport Protocol (HTTP), File Transfer Protocol (FTP), Code Division Multiple Access (CDMA), Public Switched Telephone Network (PSTN), Integrated Services Digital Network (ISDM), Universal Mobile Telecommunications System (UMTS), Time Division Multiple Access (TDMA), General Packet Radio Service (GPRS), and Global System for Mobile Communication (GSM).

4. The system of claim 1, wherein said voice application uses one or more protocols consisting of Session Initiated Protocol (SIP), Global System for Mobile Communications (GSM), Real-Time Transport Protocol (RTP), and Voice over Internet Protocol (VoIP), Code Division Multiple Access (CDMA), Public Switched Telephone Network (PSTN), Integrated Services Digital Network (ISDM), Universal Mobile Telecommunications System (UMTS), and Time Division Multiple Access (TDMA), and wherein said data application uses one or more protocols consisting of Simple Mail Transport Protocol (SMTP), HyperText Transport Protocol (HTTP), File Transfer Protocol (FTP), Code Division Multiple Access (CDMA), Public Switched Telephone Network (PSTN), Integrated Services Digital Network (ISDM), Universal Mobile Telecommunications System (UMTS), Time Division Multiple Access (TDMA), General Packet Radio Service (GPRS), and Global System for Mobile Communication (GSM).

5. The system of claim 1 further comprising:
   a server, wherein said server comprises:
   a voice application for communicating said continuous audio data between said story mail transmitting device and said story mail receiving device;
   a data application for communicating said visual media between said story mail transmitting device and said story mail receiving device.

6. The system of claim 5, wherein said server uses one or more of Open Call Media Platform (OCMP), Session Initiated Protocol (SIP), Global System for Mobile Communications (GSM), Voice over Internet Protocol (VoIP), Simple Mail Transport Protocol (SMTP), HyperText Transport Protocol (HTTP), File Transfer Protocol (FTP), Real-Time Transport Protocol (RTP), Code Division Multiple Access (CDMA), Public Switched Telephone Network (PSTN), Integrated Services Digital Network (ISDM), Universal Mobile Telecommunications System (UMTS), Time Division Multiple Access (TDMA), and General Packet Radio Service (GPRS).

7. The system of claim 5, wherein said server further comprises a synchronizer that generates synchronization information based on user specified correlation information that describes a correlation for presenting said visual media with said continuous audio data.

8. The system of claim 1, wherein at least one of said story mail transmitting device and said story mail receiving device is associated with a camera phone.

9. The system of claim 1, wherein said visual media is more than one visual representation from a group consisting of electronic photos, video clips, visual representations derived from Uniform Resource Locator (URLs), and visual representations derived from HyperText Markup Language (HTML).

10. A handheld story mail receiving device, said story mail including correlated visual media with continuous audio data, the device comprising:
    a voice application for receiving said continuous audio data at said story mail receiving device;

a data application for receiving said visual media at said story mail receiving device; and a synchronizer for synchronizing the presentation of said continuous audio data and said visual media based on synchronization information that was generated from user specified correlation information that describes a correlation for presenting said visual media with said continuous audio data, wherein the presentation of said visual media results in the presentation of more than one visual representation.

11. The story mail receiving device of claim 10, said device receiving said synchronization information at said story mail transmitting device.

12. The story mail receiving device of claim 10, wherein said voice application and said data application are a part of the same application.

13. The story mail receiving device of claim 10, said visual media is more than one visual representation from a group consisting of electronic photos, video clips, visual representations derived from Uniform Resource Locator (URLs), and visual representations derived from HyperText Markup Language (HTML).

14. A method for receiving a story mail, said story mail including correlated visual media with continuous audio data, the method comprising:

receiving said continuous audio data at a story mail receiving device;

receiving said visual media at said story mail receiving device; and synchronizing the presentation of said continuous audio data and of said visual media based on synchronization information that was generated from user specified correlation information that describes a correlation for presenting said visual media with said continuous audio data, wherein the presentation of said visual media results in the presentation of more than one visual representation.

15. The method claim 14, further comprising receiving said synchronization information at said story mail receiving device.

16. The method of claim 15, wherein said voice application and said data application are a part of the same application.

17. The method of claim 15, wherein said synchronization information is formatted based on one or more of Synchronized Multimedia Integration Language (SMIL), Extensible Markup languages (XML), and Music Photos Video (MPV).

18. The method of claim 14, further comprising using a voice interface to interact with said story mail transmitting device.

19. A computer-usable medium having computer-readable program code embodied therein for causing a computer system to perform a method of receiving a story mail, said story mail including correlated visual media with continuous audio data, the method comprising:

receiving said continuous audio data at a story mail receiving device;

receiving said visual media at said story mail receiving device; and synchronizing the presentation of said continuous audio data and of said visual media based on synchronization information that was generated from user specified correlation information that describes a correlation for presenting said visual media with said continuous audio data, wherein the presentation of said visual media results in the presentation of more than one visual representation.

* * * * *

UNITED STATES PATENT AND TRADEMARK OFFICE
CERTIFICATE OF CORRECTION

PATENT NO.         : 7,558,561 B1                                                                 Page 1 of 1
APPLICATION NO.    : 10/861815
DATED              : July 7, 2009
INVENTOR(S)        : Philippe Debaty et al.

It is certified that error appears in the above-identified patent and that said Letters Patent is hereby corrected as shown below:

In column 16, line 4, in Claim 15, after "method" insert -- of --.

Signed and Sealed this

Fifth Day of January, 2010

David J. Kappos
*Director of the United States Patent and Trademark Office*